(12) United States Patent
Allen et al.

(10) Patent No.: US 6,535,221 B1
(45) Date of Patent: Mar. 18, 2003

(54) IMAGE ENHANCEMENT METHOD AND APPARATUS FOR INTERNET PRINTING

(75) Inventors: Daniel J. Allen, Derry, NH (US); Vladimir Levantovsky, North Andover, MA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/519,288

(22) Filed: Mar. 6, 2000

Related U.S. Application Data

(63) Continuation-in-part of application No. 09/338,011, filed on Jun. 22, 1999.

(51) Int. Cl.$^7$ ................................................. G09G 5/36
(52) U.S. Cl. ........................ 345/611; 345/613; 382/266
(58) Field of Search ................................ 345/611, 612, 345/613, 615, 606, 589; 382/266

(56) References Cited

U.S. PATENT DOCUMENTS

| | | | | |
|---|---|---|---|---|
| 5,054,100 A | * | 10/1991 | Tai | 382/47 |
| 5,131,057 A | * | 7/1992 | Walowit et al. | 382/41 |
| 5,446,804 A | * | 8/1995 | Allebach et al. | 382/298 |

OTHER PUBLICATIONS

Biancardi, A. et al. "Improvements to Image Magnification," 9$^{th}$ International Conference on Image Analysis and Processing, Florence, Italy, Sep. 17–19, 1997, pp. 142–149.*

Allebach, J et al. "Edge–Directed Interpolation," Proceedings of the International Conference on Image Processing (ICIP), New York, Sep. 16, 1996, pp. 707–710.*

Patent Cooperation Treaty, International Search Report, International Application No. PCT/US00/17061, mailed on Oct. 24, 2000, 7 pages.*

* cited by examiner

*Primary Examiner*—Matthew Luu
(74) *Attorney, Agent, or Firm*—Testa, Hurwitz & Thibeault, LLP

(57) ABSTRACT

A method for enhancing a digital image for printing or display on a high resolution device is described. The method includes receiving a digital source image and selecting a block of source pixels from the image. An edge array is generated from edges detected in the block of source pixels and processed with a set of logic operations to detect one of a set of edge patterns. The source coordinate system is transformed into a second coordinate system in response to the detected edge pattern and a transformed source location for the output pixel is determined. A modified transformed source location is determined by applying a modifier function. The modifier function is selected from a set of functions in response to the detected edge pattern. An effective source location is generated by applying a reverse transformation. The value of the output pixel is interpolated from the values of the block of source pixels based on the effective source location.

22 Claims, 15 Drawing Sheets

SOURCE DATA
AFTER 1.6 SCALING
USING PIXEL
REPLICATION

SOURCE DATA
AFTER 1.6 SCALING
USING BI-LINEAR
INTERPOLATION
IN X AND Y

SOURCE DATA
AFTER 1.6 SCALING
USING NON-LINEAR
INTERPOLATION
AND PATTERN
MATCHING MODIFICATION

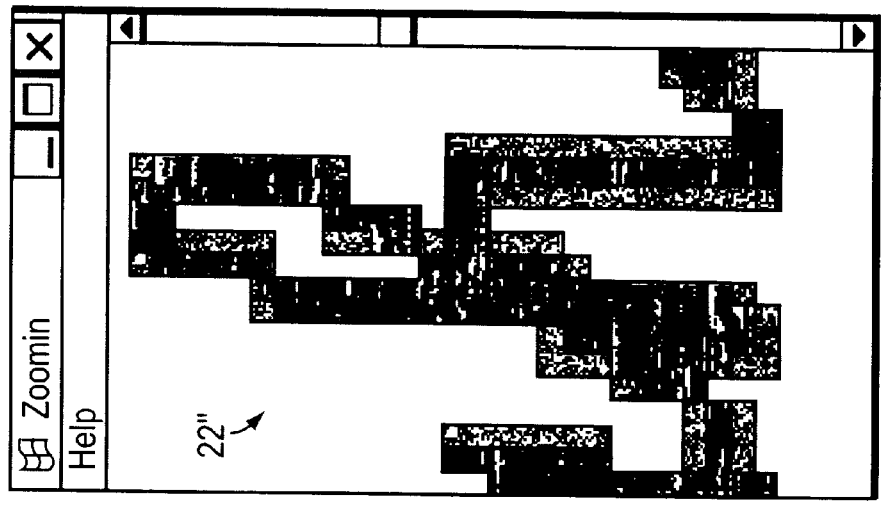
FIG. 2C  1.6 x SCALING USING NON-LINEAR INTERPOLATION AND PATTERN MODIFICATION
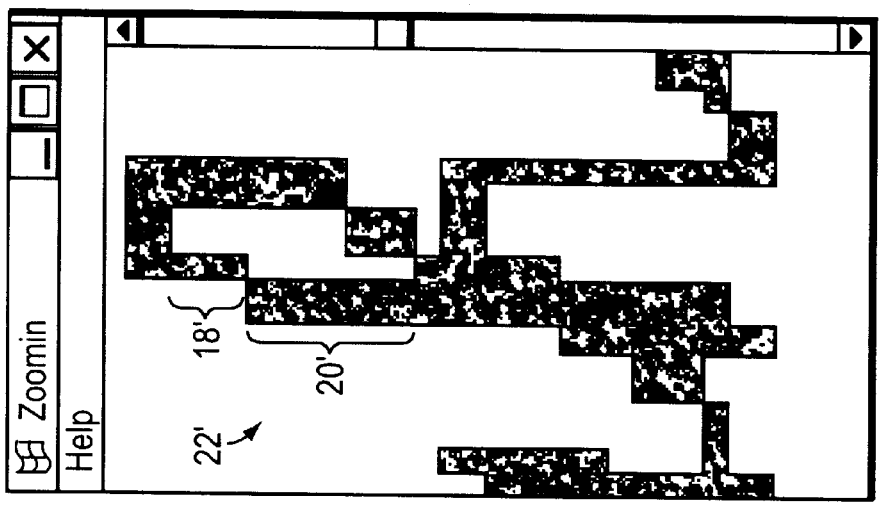
FIG. 2B  1.6 x SCALING USING PIXEL REPLICATION
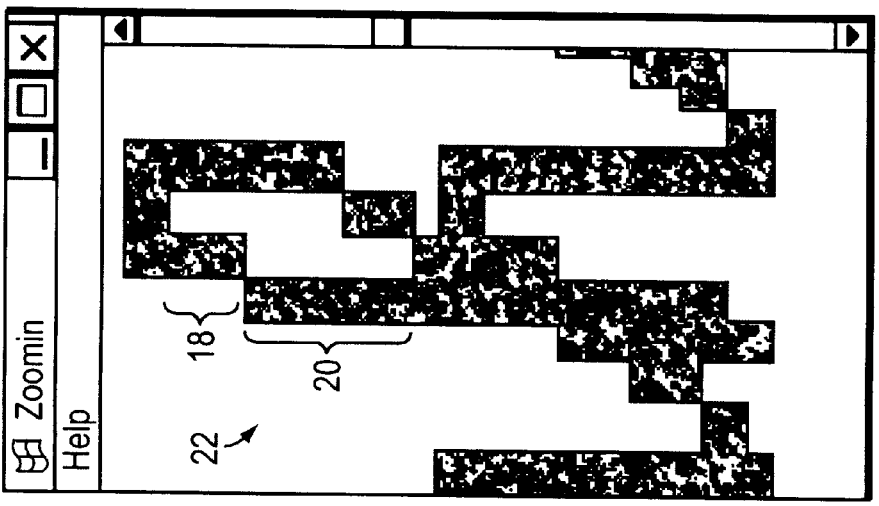
FIG. 2A  SOURCE DATA

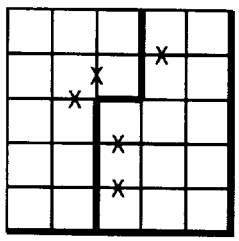 PAT01
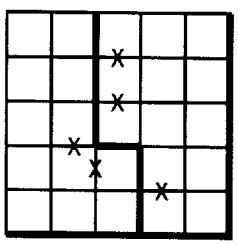 PAT02
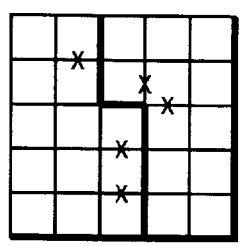 PAT03
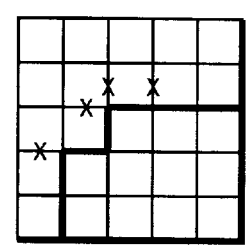 PAT04
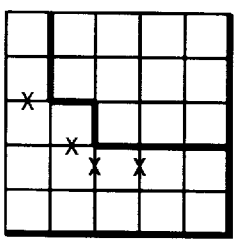 PAT05
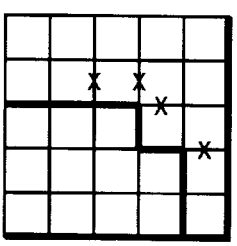 PAT06
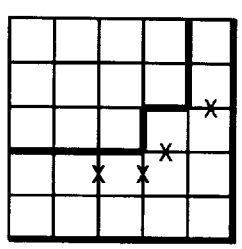 PAT07
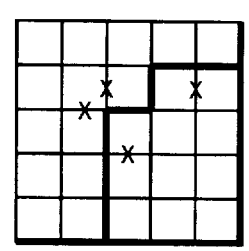 PAT08
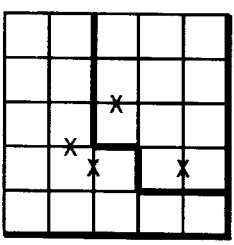 PAT09
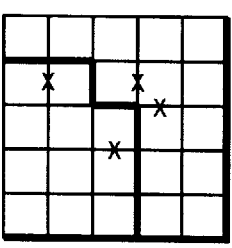 PAT10
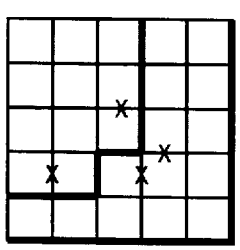 PAT11
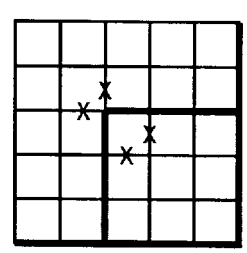 PAT12
FIG. 10A

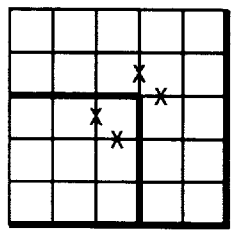
PAT13
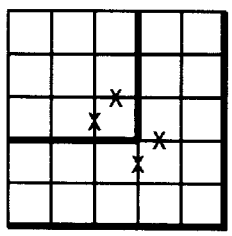
PAT14
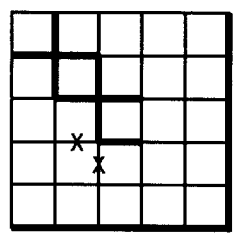
PAT15
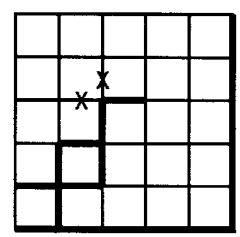
PAT16
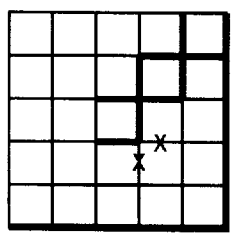
PAT17
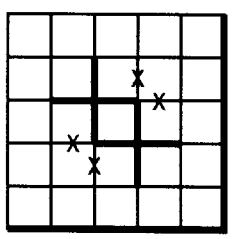
PAT18
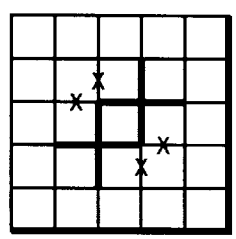
PAT19
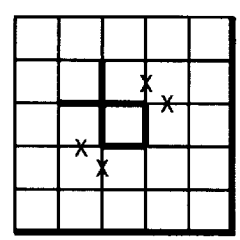
PAT20
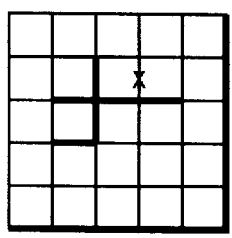
PAT21
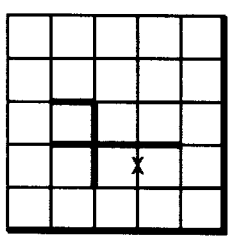
PAT22
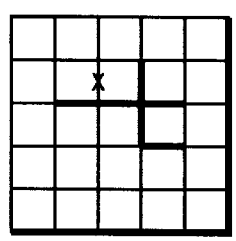
PAT23
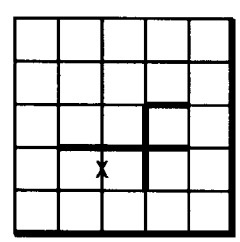
PAT24
FIG. 10B

IMAGE ENHANCEMENT METHOD AND APPARATUS FOR INTERNET PRINTING

CROSS-REFERENCE TO RELATED APPLICATIONS

This application is a continuation-in-part of U.S. patent application Ser. No. 09/338,011 which was filed on Jun. 22, 1999.

FIELD OF THE INVENTION

The invention relates generally to a method and apparatus for scaling and enhancement of digital image data. In particular, the invention relates to a method of enhancing image quality in images reproduced by higher resolution printers and display devices.

BACKGROUND OF THE INVENTION

Digital video images such as those seen on computer display monitors are typically formatted according to industry standards (e.g., VGA, SVGA and XGA). Each standard defines various resolutions. Commonly, many different resolutions are supported by computer displays, however, flat panel displays and fixed resolution cathode ray tubes (CRTs) generally do not support multiple resolutions.

Digital image data can be scaled to make it compliant with the requirements of different standards. For example, VGA (640×480) data is scaled by a factor of 1.6 to fill a fixed XGA (1024×768) display. In some cases the source image resolution is higher than the monitor and must be scaled down. Some display devices are not capable of scaling images and thus only use a portion of the display area or a subset of the source image data.

A basic scaling technique is pixel replication which exhibits dramatic artifacts for fractional scale factors. Other traditional scaling algorithms do not provide maximum quality for fixed resolution monitors. The resulting images often appear out of focus or reveal jagged edges.

Commercially available printers generally have output resolutions which exceed the resolution of the digital image. For example, images embedded in web pages downloaded from the Internet typically have low resolution. Consequently, multiple printer output pixels are generally available for each input image pixel. Unfortunately, the higher printer resolution typically is not effectively utilized to improve the quality in the printed image.

SUMMARY OF THE INVENTION

The present invention relates to a method for enhancing a digital image. The method includes receiving a digital source image and selecting a block of source pixels. The source pixels include a center pixel that bounds the center position of the output pixel in a source coordinate system. A first edge array is generated from edges detected in the block of source pixels and processed with a set of logic operations to detect one of a plurality of edge patterns. In one embodiment, the source pixels are converted from a red-green-blue (RGB) color space to a luminance-chrominance (LCC) color space.

The method also includes the step of transforming the source coordinate system into a second coordinate system in response to the detected edge pattern. A transformed source location for the output pixel is determined in the second coordinate system. In one embodiment, the transformation includes rotating the source coordinate system into the second coordinate system in response to the detected edge pattern. In a further embodiment, the rotation is through a predetermined angle matched to the detected edge pattern. In another embodiment, the transformed source location is modified by applying one of a plurality of modifier functions to generate a modified transformed source location for the output pixel. In a further embodiment, the applied modifier function is selected in response to the detected edge pattern.

The method also includes the step of generating an effective source location for the output pixel by applying a reverse transformation to the transformed source location. In one embodiment, the reverse transformation includes applying a reverse rotation to the transformed source location.

In one embodiment, the method includes the additional step of calculating a value of the output pixel based on the value of at least one source pixel within the block of source pixels. In a further embodiment, the step of calculating the value of the output pixel includes interpolating the value of the output pixel in response to the effective source location of the output pixel relative to the block of source pixels. In a further embodiment, the step of interpolating includes applying a bilinear interpolation using four adjacent pixels from the block of source pixels.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

FIGS. 2A to 2C illustrate source data, scaled source data using pixel replication, and scaled source data using a combination of bilinear interpolation and edge detection logic, respectively.

FIGS. 10A and 10B illustrate edge detection logic arrays used for identifying specific edge arrangements in source pixel array data.

DESCRIPTION OF THE INVENTION

Figure 1A:
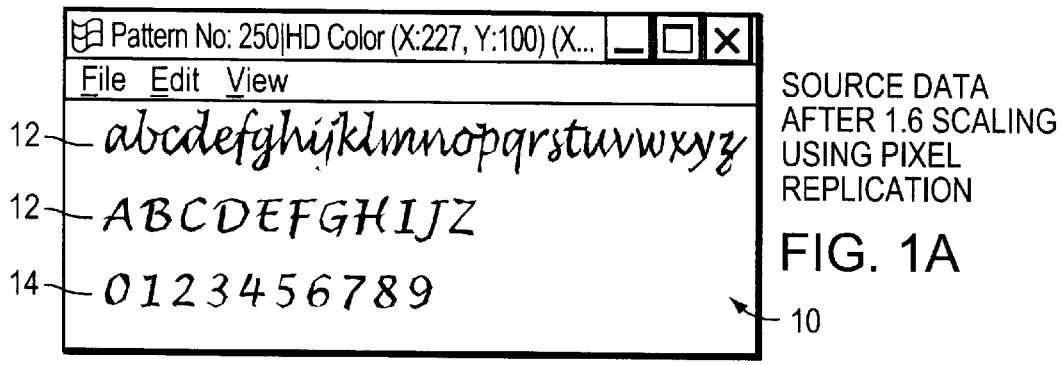
FIGS. 1A to 1C illustrate scaled source data using pixel replication, using bilinear interpolation, and using a combination of bilinear interpolation and an edge detection logic, respectively.

FIG. 1A shows script characters 12 and numerals 14 displayed as an image 10 on an XGA video monitor. The characters 12 and numerals 14 are generated from bitonal pixel values (i.e., only two possible pixel values). The source data corresponding to the characters 12 and numerals 14 were generated for display on a VGA monitor. The source data have been scaled by a factor of 1.6 to allow the characters 12 and numerals 14 to be displayed on the higher resolution XGA monitor. The smooth edges of the script characters 12 are not apparent, instead the discrete nature of the digital image can be seen as jagged edges that detract from the overall image quality.

Figure 1B:
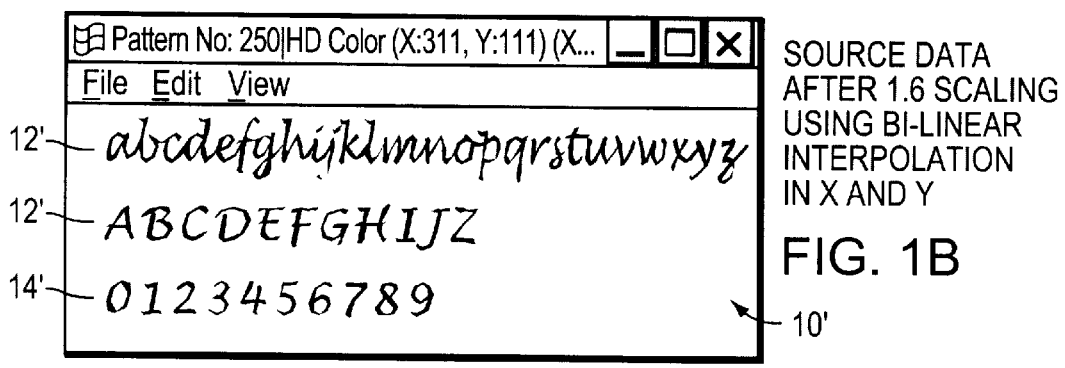

In FIG. 1B the source data used to generate the characters 12' and numerals 14' of scaled image 10' have been scaled by a value of approximately 1.6 and processed using a bilinear interpolation applied along the horizontal and vertical axes of the display. Although still observable, the jagged edges are less apparent. The result is an improved image quality.

Figure 1C:
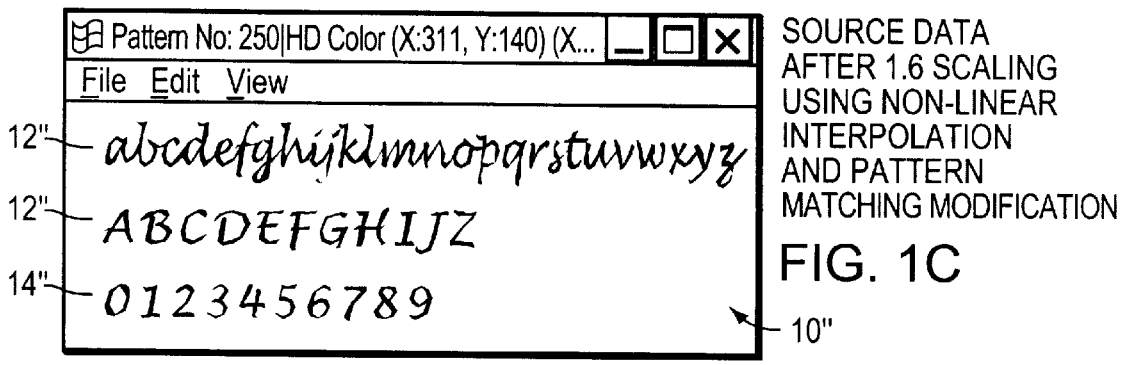

FIG. 1C shows an enhanced image 10" which includes enhanced script characters 12" and numerals 14" after processing the source data of FIG. 1A and applying the enhancement technique of the present invention. The result is an image 10" where the discrete pixel appearance inherent in many digital images is substantially reduced.

FIG. 2A illustrates a portion of a flat panel display with a partial image 22 comprised of pixels at one of only two values (i.e., pixel on or pixel off). FIG. 2B illustrates a partial image 22' displayed on the flat panel display having a vertical and horizontal resolution 1.6 times that of the monitor in FIG. 2A. The partial image 22' includes features which are of different widths than the corresponding features in the partial image 22 of FIG. 2A. For example, vertical line segment 18' which is only one pixel wide is narrower than the corresponding one pixel wide line segment 18 in the unscaled partial image 22. Vertical line segment 20', however, is two pixels wide and thus is slightly wider than the corresponding line segment 20 in the unscaled image 22.

FIG. 2C shows an enhanced partial image 22" on the flat panel display of FIG. 2B resulting from application of the method of the present invention. The enhanced image 22" is, in part, the result of applying a non-linear interpolation technique to the data displayed in FIG. 2B. The data used to generate the enhanced image 22" was also processed with an edge detection logic algorithm to determine the location of edges (i.e., sharp changes in pixel values between adjacent pixels). A comparison of the edge locations with predetermined edge arrangements (i.e., edge arrays) corresponding to known features is performed. If the comparison determines that a feature is likely contained in the data, then pixel values in the neighborhood of the feature can be adjusted. The final result is an enhanced image 22" with a smoothing of the jagged artifacts inherent in the display of binary data. In general, the enhanced image 22" is more acceptable to the viewer than an unenhanced image 22 or 22' because the features more closely resemble the original image (before scaling).

Figure 3:
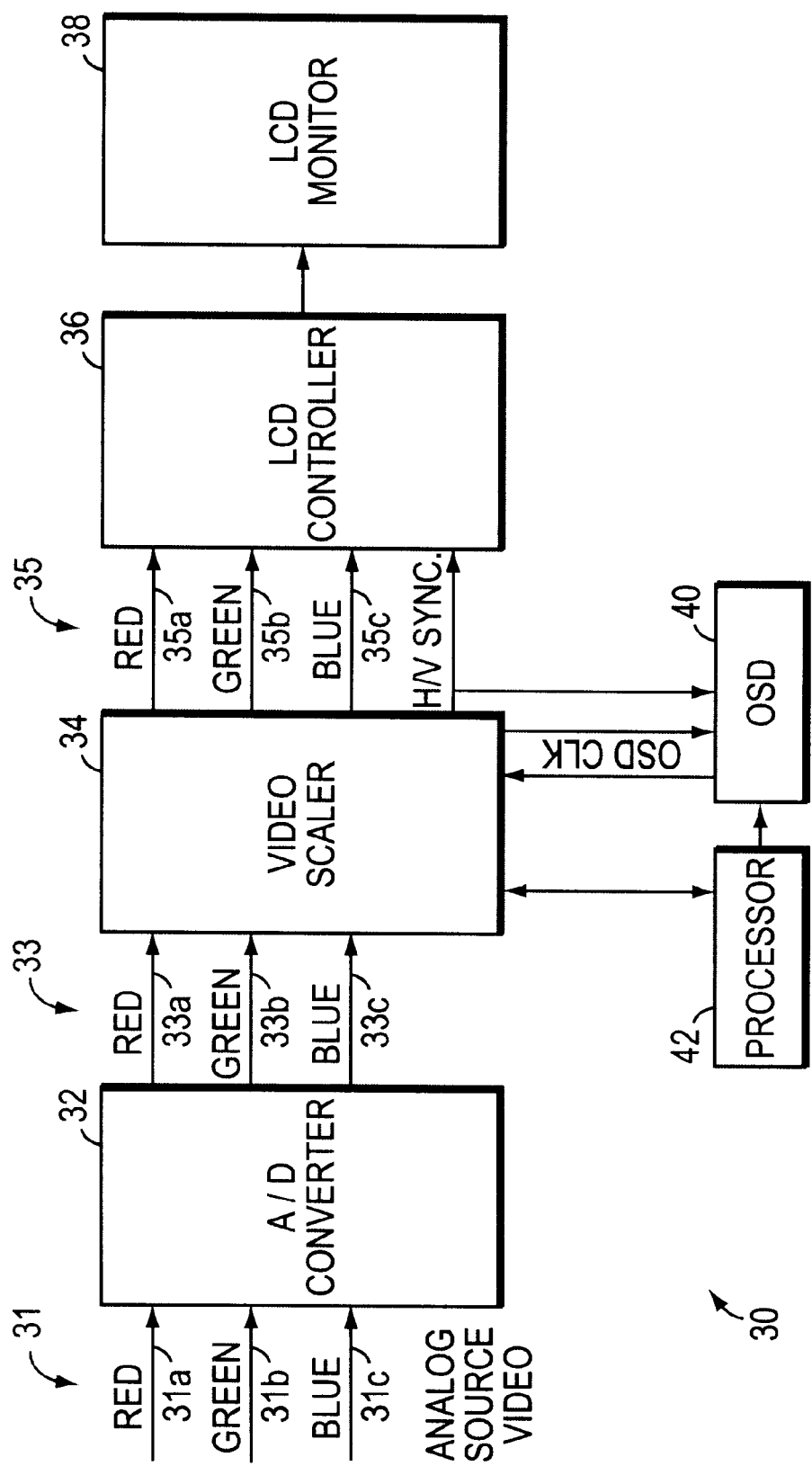
FIG. 3 is a block diagram of a system for scaling RGB video data for display on an LCD panel.

FIG. 3 shows a block diagram of a system 30 for enhancing and scaling RGB video data for compatibility with different video formats. The system 30 includes an analog-to-digital (A/D) converter 32 for receiving RGB analog source video 31*a–c* and converting it to RGB digital data 33*a–c*, respectively. After conversion to digital format, each pixel in the digital data 33*a–c* is represented by separate 8-bit components for red, green and blue. A video scaler module 34 receives the RGB digital data 33*a–c* and processes it to generate scaled pixel data 35*a–c*. A liquid crystal display (LCD) controller 36 receives the scaled pixel data 35*a–c* and drives a LCD monitor 38 displaying the enhanced image 22". An on-screen display (OSD) module 40 is used to input character data to the video scaler module 34 where it is merged into the scaled pixel data 35*a–c*. A processor 42 coordinates the operations of the video scaler module 34 and OSD module 40.

Figure 4:
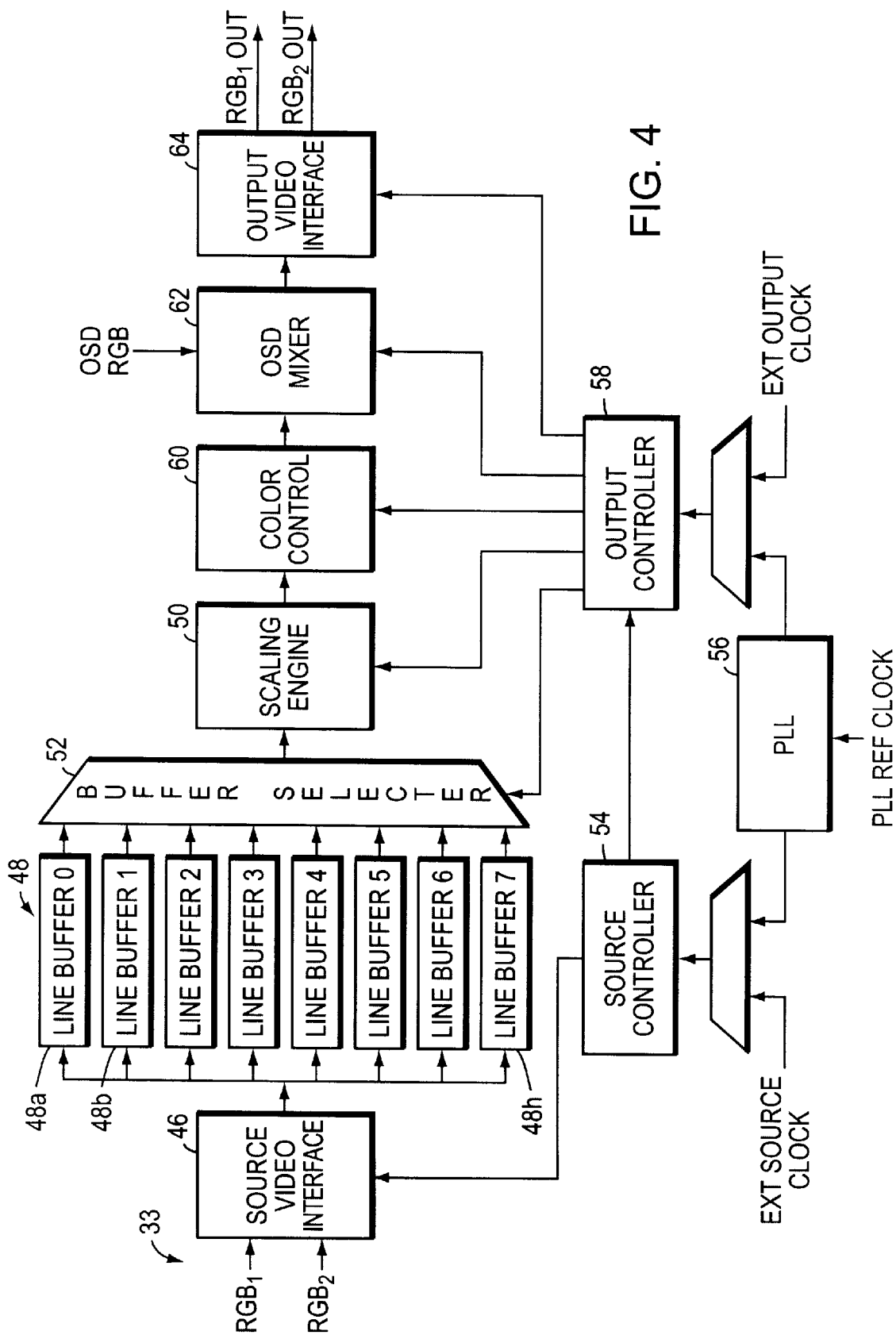
FIG. 4 is a block diagram of a video scaling module according to the invention.

FIG. 4 illustrates the components of the video scaler module 34 and processor 42. A source video interface module 46 receives input source pixels 33 (RGB digital data) from one or more A/D converters 32 or digital sources (FIG. 3) and distributes the pixels in pairs to the eight line buffers 48*a–h*. Each of the line buffers 48*a–h* is sized to support the scaleable source video mode with the greatest horizontal resolution. For example, if the largest scaleable video mode is 832×624 SVGA, then each line buffer 48 can hold 832 pixels and is structured as 416 words of 48 bits each (two pixels wide). Only the source video interface module 46 can write to the line buffers 48 and only active pixels can be stored. Scaling engine 50 receives data from selected line buffers 48 as determined by buffer selector 52. An individual buffer 48 can never be accessed simultaneously by both the source video interface module 46 and the scaling engine 50.

When the number of active source pixels does not exceed 832, each line of source video is stored into a single line buffer 48 beginning at location zero. The first source line of the vertical frame is always stored in line buffer zero 48*a*. Subsequent source lines are stored in sequentially numbered line buffers 48, wrapping around to line buffer zero 48*a* after filling the seventh line buffer 48*h*. The scaling engine 50 accesses five consecutive line buffers 48 at a time. When a subsequent output line requires a new source line, the five consecutive line buffers 48 beginning at the next sequentially numbered line buffer 48 are accessed, wrapping around to line buffer zero 48*a* after the seventh line buffer 48*h* is accessed. For example, the sequence of line buffers 48 accessed is (0-4), (1-5), (2-6), (3-7), (4-7, 0), etc.

When the number of active source pixels exceeds 832, each line of source video is stored in two consecutive line buffers 48. For example, XGA video mode requires 1024 horizontal pixels. In this case, the first 512 pixels of the source line are stored in line buffer zero 48*a* beginning at location zero. The remaining pixels of the source line are stored in line buffer one 48*b*. The first source line of the vertical frame is always stored in line buffers zero and one, 48*a* and 48*b*, respectively. Subsequent source lines are stored in sequentially numbered pairs of line buffers 48, wrapping around to line buffer zero 48*a* after filling the seventh line buffer 48*h*. The scaling engine 50 only accesses one line buffer 48 at a time because enhancement must be disabled when the number of pixels in a source video line exceeds the size of a line buffer 48. The first output line of the is vertical frame is read from line buffers zero and one, 48*a* and 48*b*, respectively. Each subsequent output line is accessed from the next pair of sequentially numbered line buffers 48, wrapping around to line buffer zero 48*a* after the seventh line buffer 48*h* has been read. For example, the sequence of line buffers 48 accessed is (0-1), (2-3), (4-5), (6-7), (1-2), etc.

A source controller 54 generates all control and timing signals related to the source pixel stream based on the source pixel clock from a phase lock loop (PLL) reference module 56 or an external source clock. In particular, the source controller 54 controls operation of the source video interface module 46 and writing to the line buffers 48. The source controller 54 communicates with an output controller 58 which is used to correctly align the source and output vertical frames. The output controller 58 controls timing for the output pixel stream based on the output pixel clock from the PLL reference module 56 or an external output clock. In particular, the output controller 58 controls the scaling engine 50, a color control module 60, an OSD mixer 62, and an output video interface module 64.

Figure 8A:
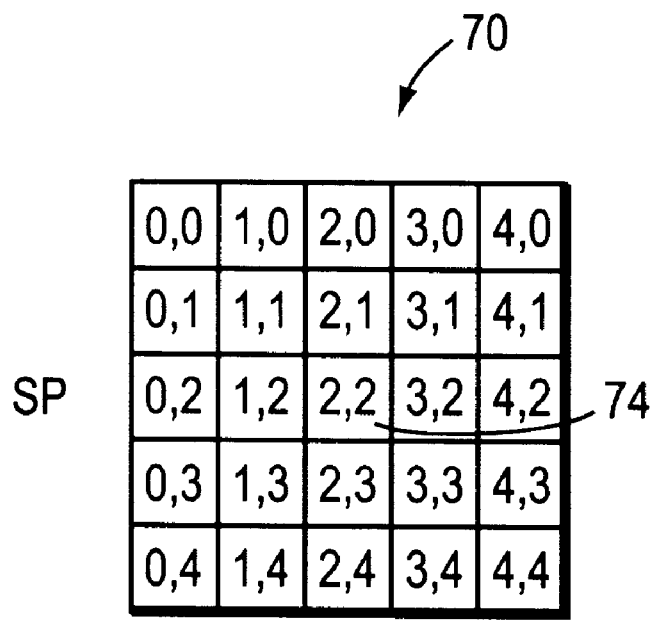
FIGS. 8A and 8B illustrate the source pixel window and the four interpolation pixels, respectively, used to generate an output pixel value.

Referring to FIG. 8A, the scaling engine 50 maintains a 5×5 block 70 (i.e., array) of source pixels SP[0,0] through SP[4,4] which are used to calculate the value of an output pixel. When enhancement is enabled, all 25 pixels in the window 70 are used in determining the output pixel value. When enhancement is disabled, the value of the center pixel 74 (i.e., SP[2,2]) is used as the value of the output pixel. The output controller 58 provides data to the block 70 one column at a time as it is read from the line buffers 48. When enhancement is enabled, the values for each vertical column are obtained by accessing one pixel from each of five consecutive line buffers 48, one at a time. When enhancement is disabled, only the center row of pixels SP[1 ... 5,2] is actually accessed from the line buffers 48.

Figures 5A, 5B, 5C:
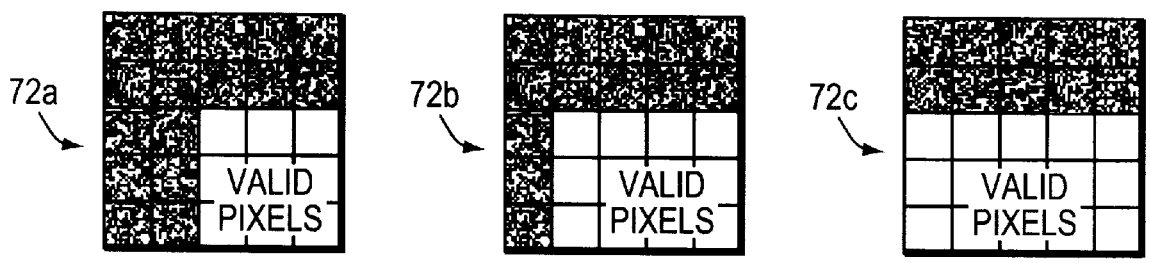
FIGS. 5A through 5C are pixel valid masks for determining valid source pixels for calculating output pixel values.

A set of five-bit row×five-bit column pixel valid masks 72 are used by the scaling engine 50 to determine which rows and columns of the block 70 are valid (see FIG. 5A). The pixel valid masks 72 are used to identify the edges and corners of the screen. For example, for the first output pixel of a vertical frame (top left pixel), the top two rows and the leftmost two columns of the window are invalid. FIGS. 5A to 5C illustrate the pixel invalid masks corresponding to the first three pixels of the top line of the source video frame, respectively. If any of the pixels in the pixel valid mask 72 are not valid, then the scaling engine 50 generates an output pixel value equal to the value of the center source pixel 74.

Figure 6:
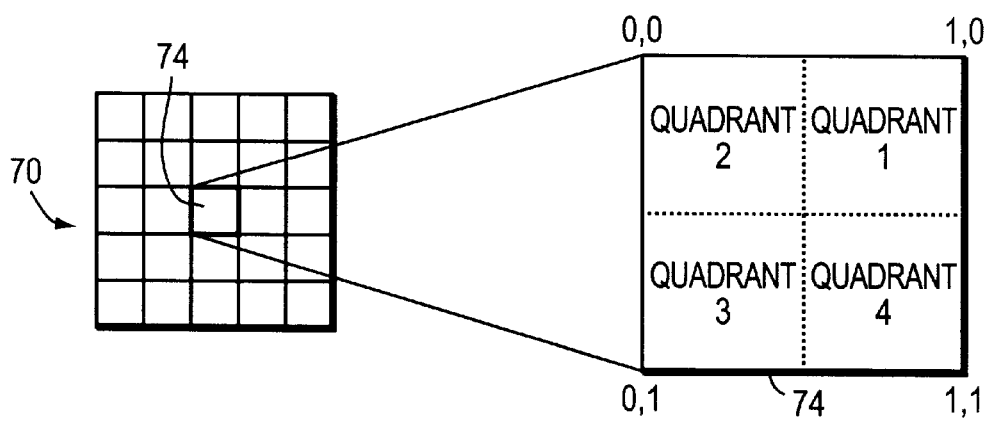
FIG. 6 illustrates the relationship of a center source pixel with respect to a source pixel window.

For each output pixel, the scaling engine 50 also receives the position of the output pixel relative to the center source pixel 74. Referring to FIG. 6, the center of the output pixel must always lie within the boundaries of the center pixel 74. The center pixel 74 has dimensions of (1, 1) and the coordinate system uses unsigned values with the center of the center source pixel 74 at (0.5, 0.5). The four quadrants of the center pixel 74 are also defined for use in calculating the output pixel value.

The source pixel which bounds the output pixel is determined by dividing each coordinate of the output pixel by the scale factor appropriate for the video format conversion and rounding the result to the nearest integer. The horizontal scale factor is the ratio of the width of the source video in pixels to the width of the output video in pixels. Similarly, the vertical scale factor is the ratio of the height of the source video in pixels to the height of the output video in pixels. As an example, consider which source pixel to use at the center pixel 74 of the block 70 for output pixel (29,57). Assuming the source video is VGA mode (640×480 resolution) and the output video is XGA mode (1024×768 resolution), the horizontal scale factor, $SF_H$, and vertical scale factor, $SF_V$, are $$SF_H = \frac{1024}{640} = 1.6$$

-continued $$SF_V = \frac{768}{480} = 1.6$$

Thus, the center pixel 74 is source pixel (18, 36).

Figures 7A, 7B:
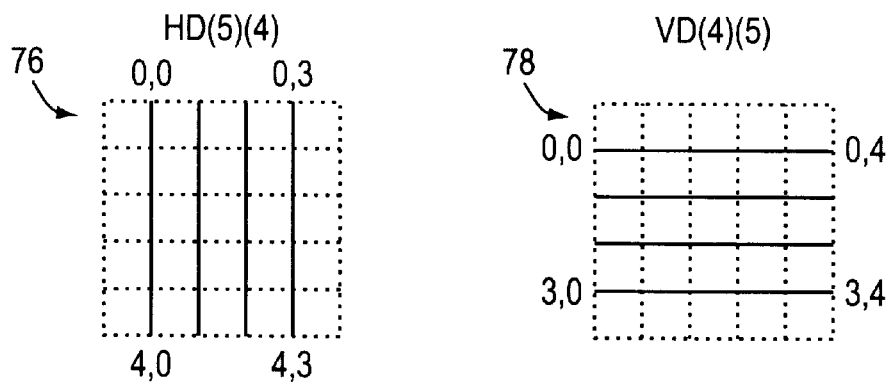
FIGS. 7A and 7B illustrate possible vertical and horizontal edges, respectively, in a source pixel window.

The method used by the scaling engine 50 to determine the output pixel value is based on several steps. First, the pixel values of the block 70 are processed to generate horizontally and vertically detected edges between adjacent pixels. Referring to FIGS. 7A and 7B, there are a total of 40 possible edges in each block 70. The horizontally detected edges are stored in a 4×5 horizontal edge array 76 and the vertically detected edges are stored in a 5×4 vertical edge array 78. For each possible edge, a difference flag is defined and set if its corresponding edge exists. An edge exists between two adjacent pixels when the distance in the color space between the two pixels exceeds a programmable edge threshold value.

The next step for determining the output pixel value is to process the horizontal and vertical edge arrays 76 and 78 with a set of predetermined logic arrays. An illustrative set of logic arrays 84 shown as Pat01 to Pat24 is depicted in FIGS. 10A and 10B. Other sets of logic arrays 84 can be used. The total number of logic arrays 84 and the particular logic defined by each array 84 for each set is generally determined by the specific hardware implementation and known source image characteristics.

Each logic array 84 consists of 40 logic operations corresponding to the 40 edge flags. Each logic operation generates a decision variable which can have one of three possible logical values (true, false or don't care). The decision variables for each logic array 84 are represented as follows:

| or _ edge must be present for a match
x all edges must be absent for a match
No |, _ or x presence or absence of edge is not relevant (don't care)

The logical values are determined according to the truth table shown in Table 1.

TABLE 1

Edge Match Truth Table

| Decision Variable | Edge Flag | Match |
|---|---|---|
| True | True | True |
|  | False | False |
| False | True | False |
|  | False | True |
| Don't-care | True | True |
|  | False |  |

A logic array 84 is considered to match with a set of edge arrays 76 and 78 when all of its decision variables have true or don't-care logical values. If a match is found, a match variable is set equal to a value which uniquely describes the matched logic array (i.e., an index value). If more than one match exists, the match variable is set based on the first matched logic array. The match variable is set to zero when no match exists.

Figure 8B:
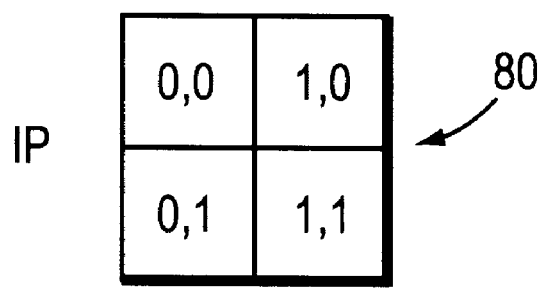

Referring to FIGS. 8A and 8B, the value of the output pixel is calculated from a 2 by 2 source pixel array 80, which is selected from the block 70 according to the quadrant of the center source pixel 74 which borders the output pixel. The four source pixels 80 selected include the center pixel 74 and the three source pixels which are the closest to the output pixel center. For example, if the output pixel is centered in the third quadrant (see FIG. 6) of the center source pixel 74 then the selected pixels are SP[1,2], SP[2,2], SP[1,3] and SP[2,3].

Figure 9:
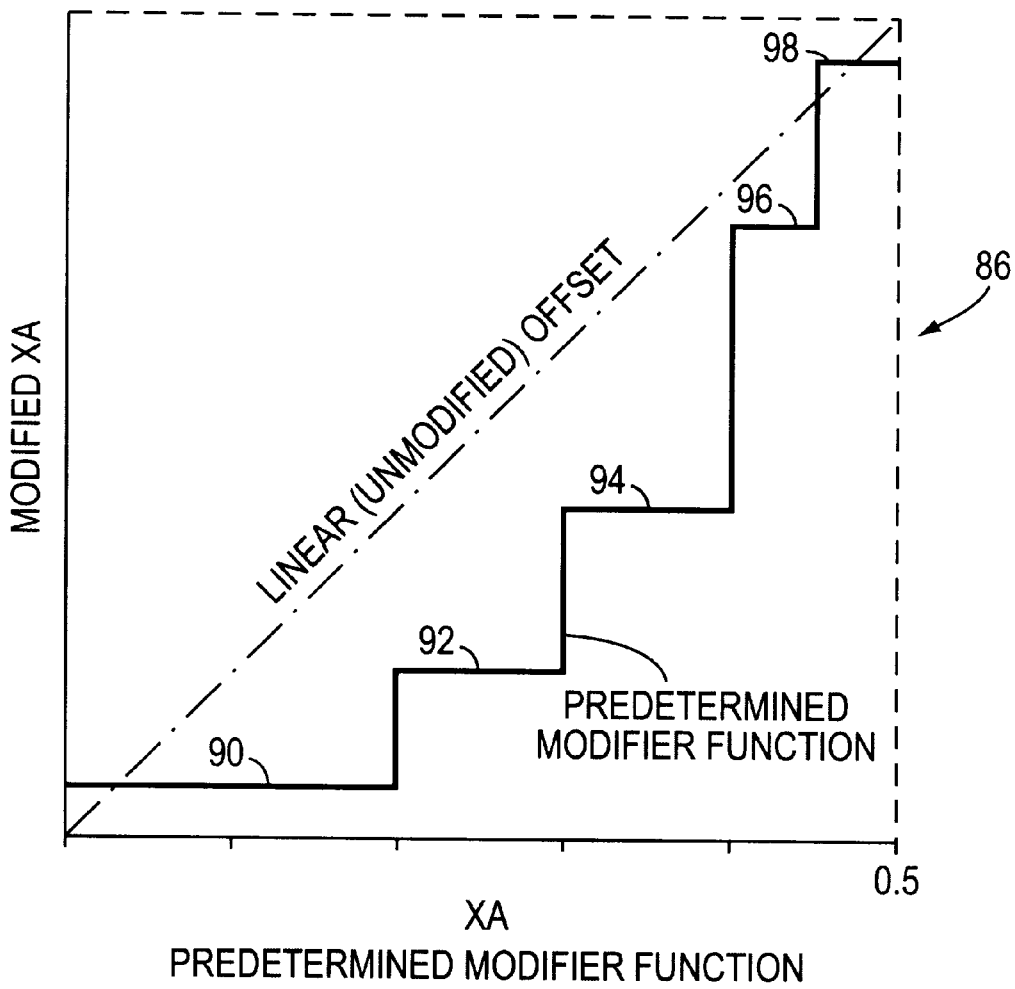
FIG. 9 is a plot of a step function offset adjustment used in generating a modified effective source location of an output pixel.

In another step performed by the scaling engine 50, the offset (XA, YA) of the output pixel relative to the center of the center source pixel 74 is determined. XA and YA can be conditionally adjusted if a logic array 84 is matched. Each logic array 84 defines a condition which is a function of the quadrant of the center source pixel 74 in which the output pixel center is located. If the condition is true, then the values of (XA, YA) are adjusted, effectively changing the location of the center source pixel 74 with respect to the block 70. Each offset or adjusted offset value is then modified according to a predetermined modifier function 86 as shown in FIG. 9. The predetermined modifier function 86 is defined in steps 90, 92, 94, 96 and 98 by assigning a unique offset value for each of a range of offset values. The function 86 is programmable to adapt to the requirements of a particular display application.

In another step, two 1×2 arrays (not shown) of interpolation constants, XC and YC, are defined. The quadrant of the center source pixel 74 in which the output pixel center is located based on the adjusted offset is used to determine XC and YC as follows:

Quadrant 1
   XC[0]=1−XA
   XC[1]=XA
   YC[0]=YA
   YC[1]=1−YA

Quadrant 2
   XC[0]=1−XA
   XC[1]=1−XA
   YC[0]=YA
   YC[1]=1−YA

Quadrant 3
   XC[0]=1−XA
   XC[1]=1−XA
   YC[0]=1−YA
   YC[1]=YA

Quadrant 4
   XC[0]=1−XA
   XC[1]=XA
   YC[0]=1−YA
   YC[1]=YA

If enhancement is disabled or if any of the source pixels in the block 70 are invalid due to intersection with the edges of the source bitmap, then the output pixel value is assigned the same value as the center source pixel 74. Otherwise, the output pixel value C is obtained by bilinear interpolation of the four pixels in IP as follows:

$$C1 = (IP[0,0].C * XC[0]) + (IP[1,0].C * XC[1])$$

$$C2 = (IP[0,1].C * XC[0]) + (IP[1,1].C * XC[1])$$

$$C = (C1 * YC[0]) + (C2 * YC[1])$$

where IP[0,0].C, IP[1,0].C, IP[0,1].C and IP[1,1].C are the value for one color (e.g., red, green or blue) of the four interpolation pixels shown in FIG. 8B. This bilinear interpolation is used to generate all color values for each output pixel.

Figure 11A:
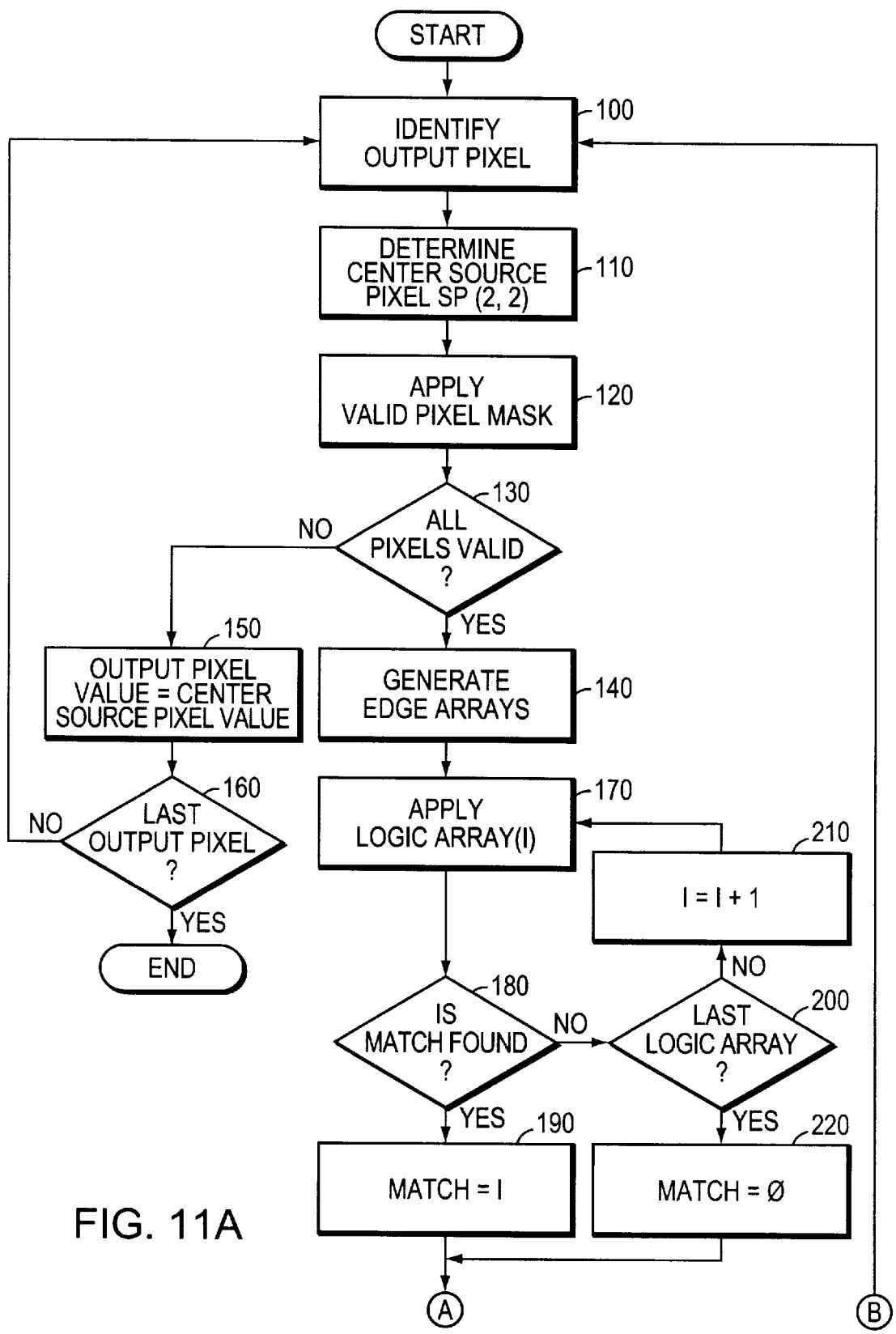
FIGS. 11A and 11B are a flowchart of an iterative method of scaling digital image data according to the invention.
Figure 11B:
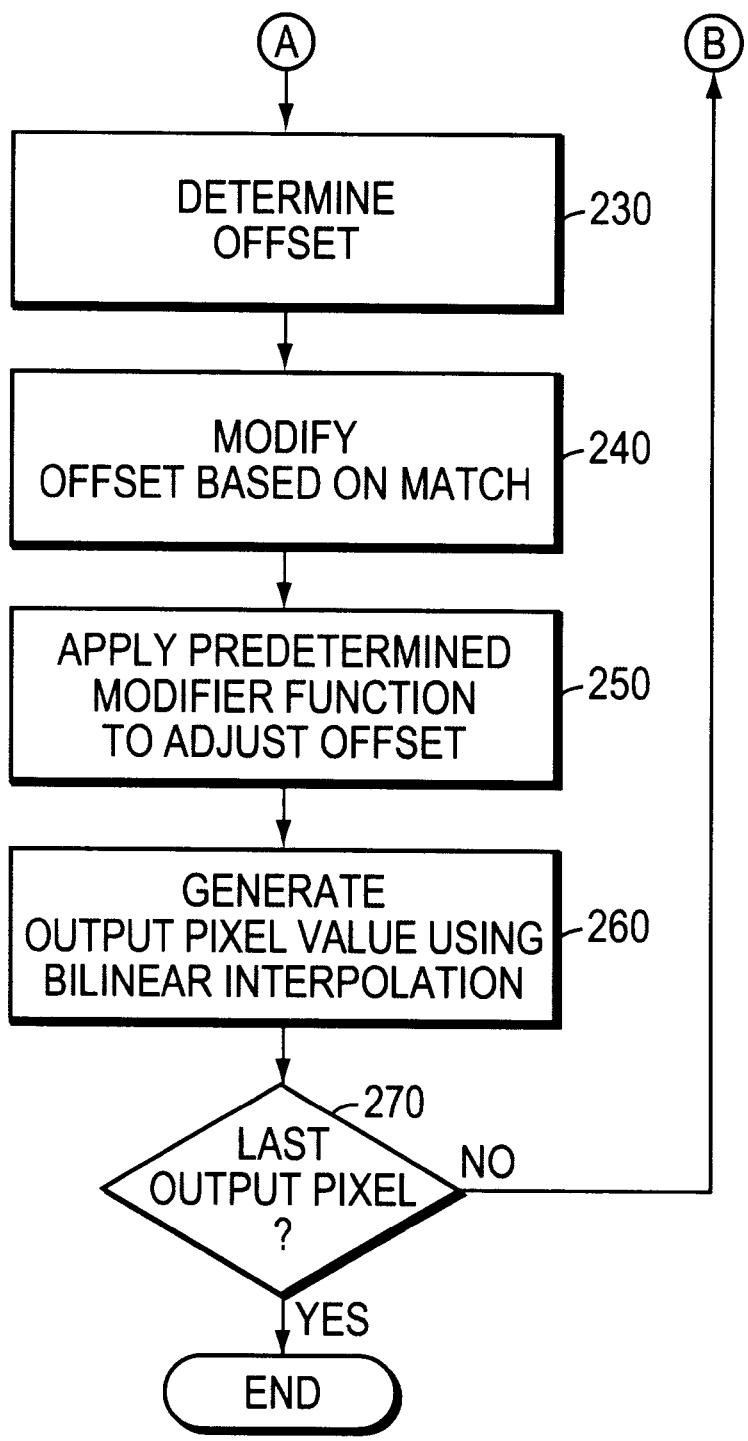

Referring to the flowchart in FIG. 11, one implementation of the method of the invention is described as a series of steps. At step 100, the next output pixel to be generated for the scaled display is determined. At step 110, the corresponding center source pixel 74 is determined by dividing the coordinates of the output pixel by the corresponding horizontal and vertical scale factors, $SF_H$ and $SF_V$, respectively, and rounding the result to the nearest integer. A valid pixel mask 72 corresponding to the center source pixel 74 is applied in step 120 and a determination as to whether all pixels are valid is made in step 130. If all the pixels are valid then horizontal and vertical edge arrays are generated in step 140. If not all the pixels are valid, however, the output pixel value is assigned the value of the center source pixel in step 150, whether any more output pixel values are to be determined is decided in step 160 and the method returns to step 100, if necessary.

After step 140 is completed, the first of the set of logic arrays 84 is applied to the edge arrays 76 and 78 in step 170. If a match is determined in step 180, then a match variable is set to indicate the matched array in step 190. If no match results from step 180 and if there is at least one more logic array 84 to be applied as determined in step 200, then the next logic array 84 is applied (steps 210 and 170). If no match results from step 180 and there are no more logic arrays 84 to be applied, then the match variable is set to zero in step 220.

At step 230, the absolute offset values of the output pixel relative to the center of the center source pixel 74 are determined. The offsets are modified in step 240 based on the match variable value. A predetermined modifier function 86 is used to adjust the offset values in step 250. The output value of the pixel is determined by bilinear interpolation in step 260 using the offset values generated in the previous step. If any more output pixel values must be determined according to step 270, another iteration is started by returning to step 100.

The method of enhancement of digital images of this invention is also useful in improving the appearance of digital images received from scanners, digital cameras and the Internet. For example, digital images embedded in web pages are downloaded in formats in which the resolution is typically substantially less than the maximum resolution of commercially available printers. Such printers can effectively provide multiple output pixels for each image pixel in the received image file. Thus, scaling and subsequent processing to determine the intensity and color of each output pixel normally yields an improvement in image quality.

Figure 12A:
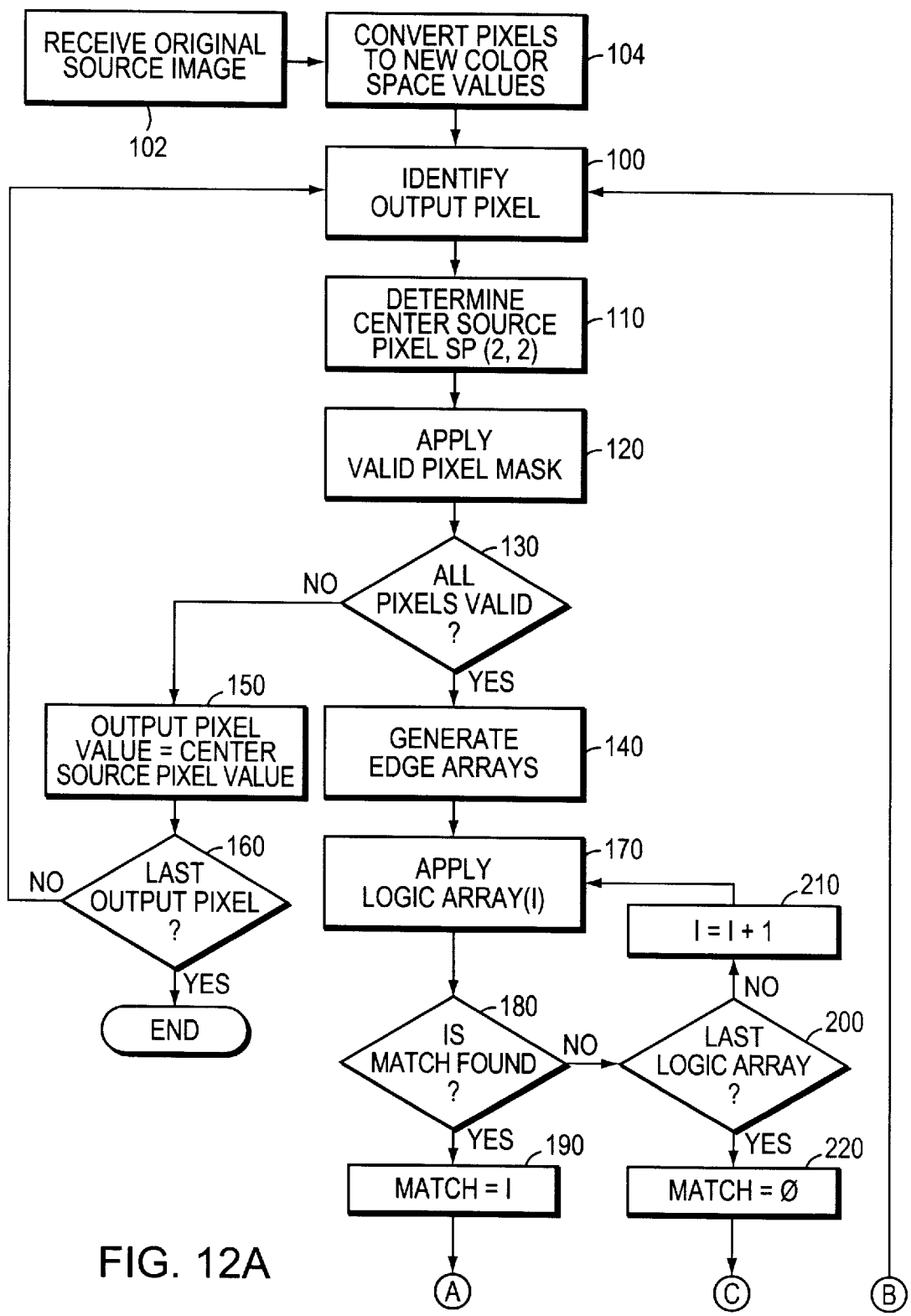
FIGS. 12A and 12B are a flowchart of an iterative method of enhancing a digital image according to the invention.
Figure 12B:
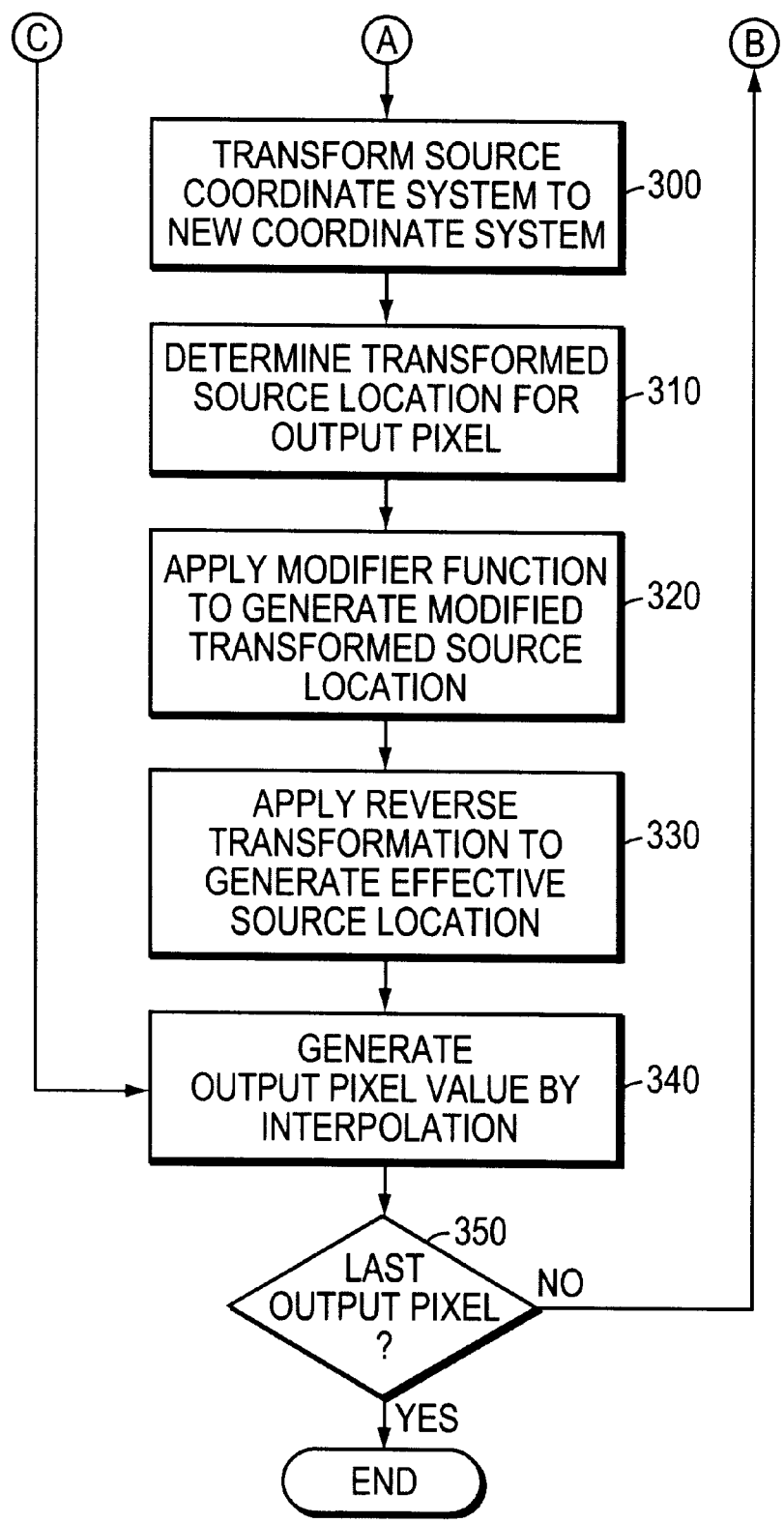

Referring to FIG. 12, one embodiment of a method of enhancing a digital image includes receiving the digital image in step 102. In optional step 104, the values of the image pixels are converted to a new color space. For example, if the received digital image is in RGB format, the pixels can be converted to LCC values through transformations known in the art. The derived luminance values can be better for distinguishing edges as detected by eye than RGB values.

The next output pixel to be generated is determined in step 100. At step 110, the corresponding center source pixel is determined and, at step 120, a valid pixel mask for the current center source pixel is applied. A determination as to whether all pixels in the mask are valid is made in step 130. If at least one of the pixels in the mask is not valid, the output pixel value is assigned the value of the center source pixel in step 150 and determination of whether the last output pixel has been processed occurs in step 160. If the last output pixel has not yet been processed, the method returns to step 100. Otherwise, if there are no more output pixel values to generate, the method ends or returns to the beginning for processing the next image.

Referring back to step 130, if all the pixels in the mask are valid, the method proceeds to step 140 to generate horizontal and vertical edge arrays. A set of logic arrays is applied to the edge arrays in step 170. If a match is determined in step 180, a match variable corresponding to the matched array is set in step 190. If no match is found in step 180 and if there is at least one more logic array to be applied as determined in step 200, the next logic array is applied (steps 210 and 170). If no match results from step 180 and if there are no more logic arrays to be applied, the match variable is set to zero in step 220 and the method proceeds to step 340 where the output pixel value is generated through application of an interpolation function using values from the 5 by 5 array of pixels.

Figure 13:
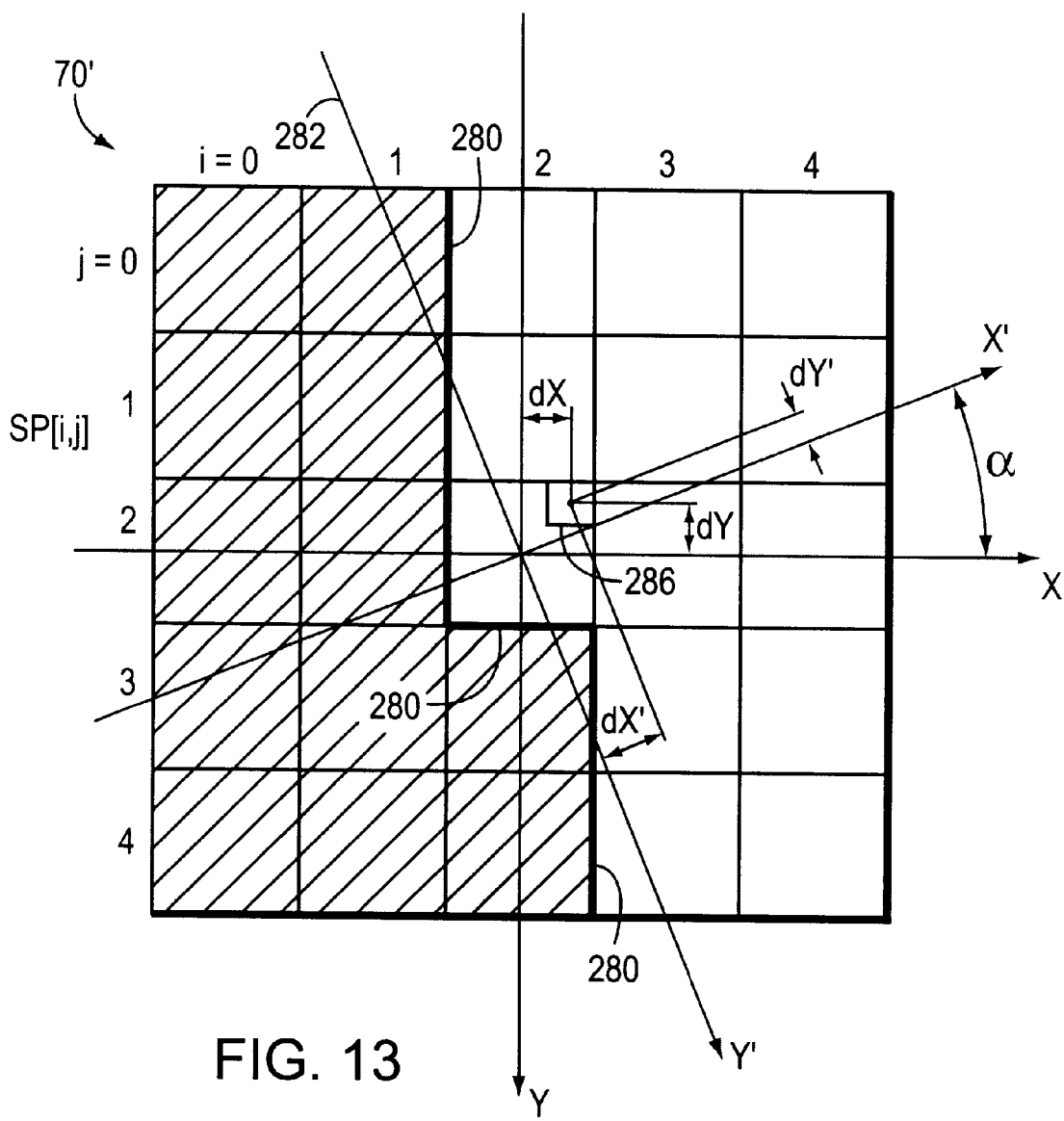
FIG. 13 illustrates the relationship of an output pixel with respect to a block of source pixels, a source coordinate system and a transformed coordinate system.

In step 300, the source coordinate system is transformed by rotation through a predetermined angle into a new coordinate system. The predetermined angle corresponds to the matched logic array. Referring to FIG. 13 for an illustrative example, a 5×5 block 70 of source pixels SP[0,0] through SP[4,4] is used to calculate the value of an output pixel. The resolution increase from source pixels to output pixels is 4:1 thus there are 16 output pixels for each source pixel. In this example output pixel 286 lies in the upper right corner of the center source pixel SP[2,2] and is centered at coordinates dX and dY in the source coordinate system. Each of the twelve shaded source pixels SP[1, 1 . . . 5], SP[2, 1 . . . 5] and SP[3,4 . . . 5] has a first luminance value and each of the thirteen unshaded pixels SP[3,1 . . . 3], SP[4,1 . . . 5] and SP[5,1 . . . 5] has a second luminance value. The difference between the first and second luminance values exceeds a preset threshold resulting in detected edges along the transition 280.

An estimated edge y' 282 corresponding to the matched logic array is defined at an angle $\alpha$ from the y axis of the source coordinate system (x and y axes). Because each source pixel is effectively divided into 16 output pixels, the values of each output pixel can be generated such that the jagged appearance of the transition 280 is reduced, resulting in a better approximation to the estimated edge y' 282.

Referring back to FIG. 12, in step 310 the transformed source location for the output pixel is determined by transforming coordinates dX and dY into their corresponding coordinates dX' and dY' in a transformed (i.e., rotated) coordinate system (x' and y' axes). The transformation is based on the predetermined rotation angle $\alpha$ and is given by $$dX'=dX \cos(\alpha)-dY \sin(\alpha) \tag{1}$$

$$dY'=dY \cos(\alpha)+dX \sin(\alpha) \tag{2}$$

Figure 14:
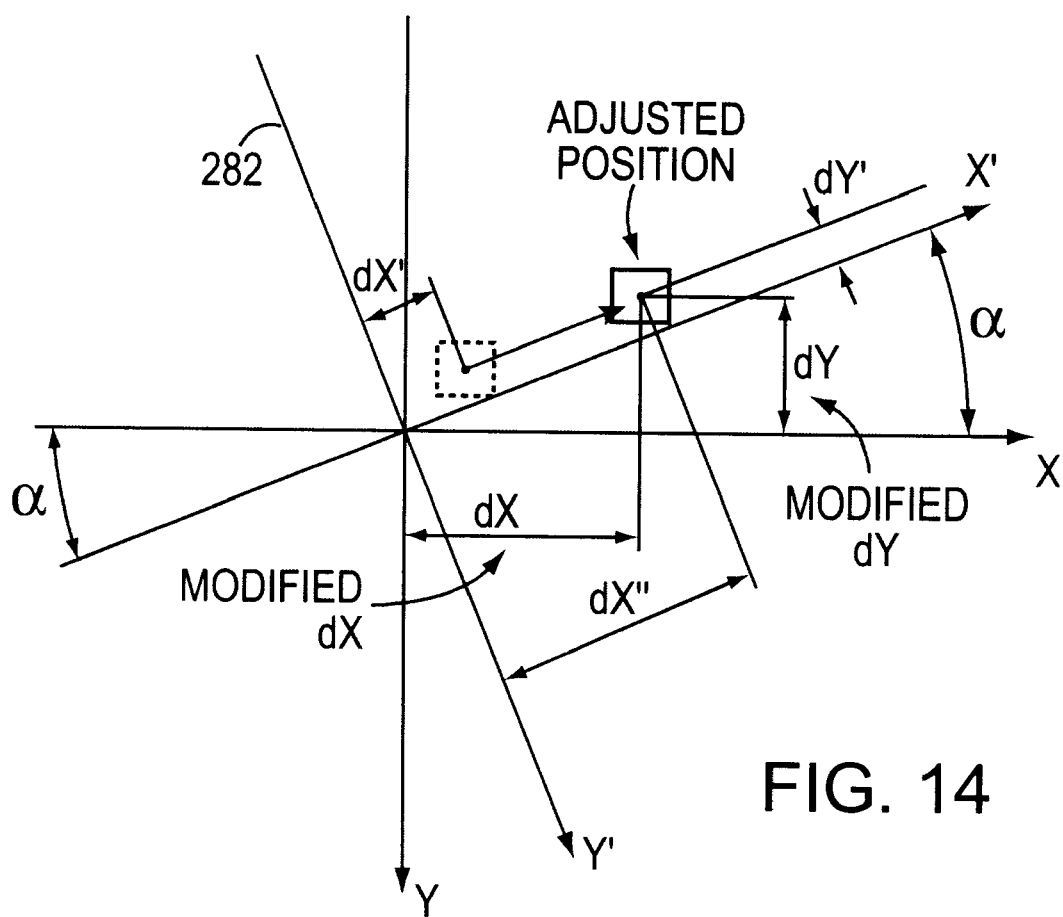
FIG. 14 illustrates the application of a modifier function to generate a modified transformed source location for an output pixel in the transformed source coordinate system.

A modifier function is applied in step 320 to generate a modified transformed source location as shown in FIG. 14. In this example, the transformed source location at (dX', dY') is effectively pushed away from the estimated edge y' 282 in a direction perpendicular to the x' axis to a modified transformed source location at coordinate (dX", dY") by application of a centrifugal modifier function $G_1(z)$.

For other matched logic arrays, the transformed source location (dX', dY') is pushed away from or pulled towards an estimated edge by application of a centrifugal modifier function $G_1(z)$ or centripetal modifier function $G_2(z)$, respectively. Determination of which modifier function $G_1(z)$ and $G_1(z)$ to use is based on the particular matched logic array. For example, if the edge in the corresponding matched pattern has no finite area associated with it (e.g., an edge of an object), the centrifugal function $G_1(z)$ is applied. Conversely, if the edge in the matched pattern is close to and parallel with another edge, there is a significant probability that the edge corresponds to a line feature and the centripetal function $G_2(z)$ is applied. In addition, some matched patterns can correspond to unique features such as those encountered in some text characters. In this situation, the centripetal function $G_2(z)$ can also be applied.

The modifier functions $G_1(z)$ and $G_2(z)$ acts on dX' and/or dY', depending on the particular matched pattern. In one embodiment, the modifier functions $G_1(z)$ and $G_2(z)$ are given by $$G_1(z)=(1-(1-2|z|)^\gamma)*D(\alpha) \tag{3}$$

and $$G_2(z)=(2|z|)^\gamma*S(z) \tag{4}$$

where z is one of the coordinates dX' or dY' of the output pixel, $S(z)=1$ if $z \geq 0$ and $S(z)=-1$ if $z<0$. $D(\alpha)$, the depth factor, is given by $$D(\alpha)=K*\sqrt{1+(\tan(\alpha))^2} \tag{5}$$

where $-45° \leq \alpha \leq 45°$. The depth factor $D(\alpha)$ defines the range over which the modified transformed source location can be moved from the transformed source location by a centrifugal adjustment and is a function of the depth coefficient K and angle $\alpha$. Each logic array or group of logic arrays has a predetermined depth coefficient K.

In one embodiment, the value of the exponential variable $\gamma$ is constant. In other embodiments the value of $\gamma$ is defined separately for each logic array. Alternatively, $\gamma$ can be empirically determined for each logic array.

Referring back to step 330 in FIG. 12, an effective source location for the output pixel is determined by applying a reverse transformation to the transformed coordinate system. In the present example, this is accomplished by rotation through an angle $-\alpha$ back to the source coordinate system x,y according to equations (1) and (2) above.

Steps 300, 310 320 and 330 have a functional resemblance to steps 240 and 250 of FIG. 11. One significant advantage of the centrifugal and centripetal modifier functions of the embodiment of FIG. 12 is their ability to produce finer pixel value adjustments than those possible by application of the discrete step modifier function of FIG. 9. Furthermore, use of the centrifugal and centripetal modifier functions is scale factor independent. Thus, the same image quality is achieved regardless of the scale factor.

After completion of step 330, an output pixel value is generated in step 340 by interpolation using values from the block of source pixels. A bilinear interpolation, as described for 2 by 2 source pixel array IP from FIGS. 8A and 8B, can be applied to generate the value (e.g., RGB values) for the output pixel. One having skill in the art will recognize that other interpolation techniques, including non-linear interpolation techniques, can be applied to generate the value of the output pixel.

If the source image includes LCC values (or if the original values of the source array pixels were converted to LCC values), interpolation yields a luminance value for the output pixel. Optionally, the luminance value can be converted to equivalent RGB values.

EQUIVALENTS

While the invention has been particularly shown and described with reference to specific embodiments, it should be understood by those skilled in the art that various changes in form and detail may be made therein without departing from the spirit and scope of the invention as defined by the appended claims.

What is claimed is:

1. A method for enhancing a digital image comprising the steps of:

a) receiving a digital source image comprised of a plurality of source pixels;

b) selecting, for an output pixel having a center position in source coordinate space, a block of source pixels having a center pixel that bounds the center position of the output pixel in source coordinate space;

c) detecting edges in the block of source pixels to generate a first edge array;

d) processing the first edge array with a set of logic operations to detect one of a plurality of edge patterns;

e) transforming a source coordinate system into a second coordinate system in response to the detected edge pattern;

f) determining a transformed source location for the output pixel relative to the second coordinate system; and g) generating an effective source location for the output pixel by applying a reverse transformation to the transformed source location.

2. The method of claim 1 wherein step e) comprises rotating the source coordinate system into a second coordinate system in response to the detected edge pattern.

3. The method of claim 2 wherein step g) comprises generating an effective source location for the output pixel by applying a reverse rotation to the transformed source location.

4. The method of claim 2 wherein the rotation is through a first predetermined angle matched to the detected edge pattern.

5. The method of claim 3 wherein the reverse rotation is through a second predetermined angle.

6. The method of claim 5 wherein the second predetermined angle is the negative of the first predetermined angle.

7. The method of claim 1 wherein step f) further comprises the step of modifying the transformed source location by applying one of a plurality of modifier functions to generate a modified transformed source location for the output pixel in the transformed source coordinate system prior to performing step g).

8. The method of claim 7 wherein the applied one of a plurality of modifier functions is selected in response to the detected edge pattern.

9. The method of claim 7 wherein the plurality of modifier functions comprises a centripetal modifier function.

10. The method of claim 7 wherein the plurality of modifier functions comprises a centrifugal modifier function.

11. The method of claim 1 wherein step a) further comprises converting the plurality of source pixels from a first color space to a second color space.

12. The method of claim 11 wherein the first color space is a red-green-blue color space and the second color space is a luminance-chrominance color space.

13. The method of claim 12 wherein the block of source pixels in step b) comprises luminance values and wherein step c) comprises detecting edges in the block of source pixels having luminance values to generate the first edge array.

14. The method of claim 11 wherein step g) further comprises the step of converting the value of the output pixel from the second color space back to the first color space.

15. The method of claim 1 further comprising the step of calculating a value of the output pixel based on the value of at least one source pixel within the block of source pixels.

16. The method of claim 1 wherein step c) further comprises generating a second edge array and wherein the first edge array corresponds to horizontally detected edges and the second edge array corresponds to vertically detected edges.

17. The method of claim 15 wherein the step of calculating the value of the output pixel comprises interpolating the value of the output pixel in response to the effective source location of the output pixel relative to the block of source pixels.

18. The method of claim 15 further comprising the step of graphically displaying the value of the output pixel.

19. The method of claim 17 wherein the step of interpolating the value of the output pixel comprises applying a bilinear interpolation using four adjacent pixels within the block of source pixels relative to the effective source location of the output pixel.

20. The method of claim 1 wherein step c) comprises detecting a difference in color values for each pair of adjacent pixels in the block of pixels.

21. The method of claim 20 wherein step c) further comprises comparing the difference in color values for each pair of adjacent pixels in the block of pixels with a threshold value.

22. The method of claim 1 wherein the output pixels have a different spatial resolution than the source pixels.

* * * * *